United States Patent [19]

Stewart et al.

[11] 4,436,507

[45] Mar. 13, 1984

[54] FLUIDIZED BED REACTOR UTILIZING ZONAL FLUIDIZATION AND ANTI-MOUNDING AIR DISTRIBUTORS

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 283,864

[22] Filed: Jul. 16, 1981

[51] Int. Cl.³ .............................................. F23D 19/02

[52] U.S. Cl. .................................... 431/170; 110/263; 122/4 D

[58] Field of Search .................... 431/7, 170; 122/4 D; 110/245, 263; 432/15, 58; 34/57 A, 57 B; 422/143, 311

[56] References Cited

U.S. PATENT DOCUMENTS 3,387,590 6/1968 Bishop .
3,565,022 9/1969 Bishop .
3,659,559 5/1972 Foldes et al. .
3,736,908 6/1973 Ehrlich et al. .
3,881,857 5/1975 Hoy et al. .
4,184,438 1/1980 Bryers et al. ........................ 110/263
4,270,468 6/1981 Robinson et al. ................... 110/245
4,335,661 6/1982 Stewart et al. ...................... 110/245

*Primary Examiner*—Lee E. Barrett
*Attorney, Agent, or Firm*—Marvin A. Naigur; John E. Wilson; Warren B. Kice

[57] ABSTRACT

A fluidized bed reactor in which a grate is disposed in a housing for receiving a single bed of particulate material. The interior of the housing below the grate is divided into a plurality of zones and air is selectively passed through portions of the grate to fluidize corresponding portions of the bed above the zones. A plurality of air distributors are provided in the bed for reducing the height of the particulate material accumulating in various portions of the bed.

3 Claims, 2 Drawing Figures

10
34
18
34
34
14
12
20
20
20
16
18
18
36
40b
40b
22
40
40
50
50
24
48
48
26a
26b
26c
44
44
40a
40
26
45
45
30
28a
30
28b
30
28c
30
28
42

10
34
34
34
18
14
20
18
16
12
18
20
20
36
70
70
22
70
66
66
50
50
48
44
26a
44
26b
26c
48
60
62
26
45
45
64
68

FLUIDIZED BED REACTOR UTILIZING ZONAL FLUIDIZATION AND ANTI-MOUNDING AIR DISTRIBUTORS

BACKGROUND OF THE INVENTION

This invention relates to a fluidized bed reactor and, more particularly, to such a reactor in which heat is generated by the combustion of particulate fuel in a fluidized bed.

Fluidized bed reactors, usually in the form of combustors, boilers, gasifiers, or steam generators, are well known. In a normal fluidized bed arrangement, air is passed through a perforated plate, or grate, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. In addition to enjoying a high capability for reducing the amount of sulfur in the gases introduced to the atmosphere, such an arrangement permits relatively high heat transfer rates per unit size, substantially uniform bed temperatures, relatively low combustion temperatures, and reduction in corrosion and boiler fouling.

In the fluidized bed combustion process, the coal and adsorbent are continuously introduced into the bed by suitable feeders, injectors, or the like and the spent coal and adsorbent are discharged from the lower portion of the bed, usually through a gravity drain pipe extending through a wall of the heat exchanger or through a discharge opening.

In order to optimize operating conditions, the fluidized bed has often been divided into a plurality of zones, usually by selectively introducing the fluidizing air into certain portions of the bed at different times. This enables selected zones to be fluidized while others are dormant to accommodate changing load or start-up conditions.

For example, this selective, or zonal, fluidization simplifies start-up since only a discrete zone of the bed need be preheated to support ignition, which will then readily propogate to adjacent zones as they are brought into service. Also, load control may also be easily achieved by zonal fluidization by increasing or decreasing the number of zones which are fluidized. Further, zonal fluidization enables hot gases to back flow from operating zones through the dormant beds for bed temperature maintenance prior to rapid light-off and ignition of adjacent bed sections.

However, when zonal fluidization is utilized, the area of the bed which is fluidized tends to expand in height above the grid. As a result, the flow of air and the gaseous products of combustion through the fluidized bed causes the particulate materials to tend to build up, or mound, on the unfluidized portion of the bed. This mounding, of course, destroys the parameters under which the bed operates, and can severely effect its efficiency.

SUMMARY OF THE INVENTION

It is therefore an object of the present invention to provide a fluidized bed reactor which utilizes zonal fluidization and yet eliminates any disadvantages normally associated with this technique.

It is a further object of the present invention to provide a fluidized bed reactor of the above type in which mounding of the particulate material on any portion of the bed is eliminated.

It is a further object of the present invention to provide a fluidized bed reactor of the above type in which discharge nozzles are provided for discharging a stream of air into the bed for eliminating any mounding of particulate material in the bed.

Toward the fulfillment of these and other objects, the reactor of the present invention includes a grate supported in a housing and adapted to receive a bed of particulate material. A source of air is selectively passed through selected portions of the grate to fluidize the corresponding portions of the bed of particulate material. A plurality of nozzles are disposed in the housing for reducing the build-up of the particulate material in one or more of the bed portions.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
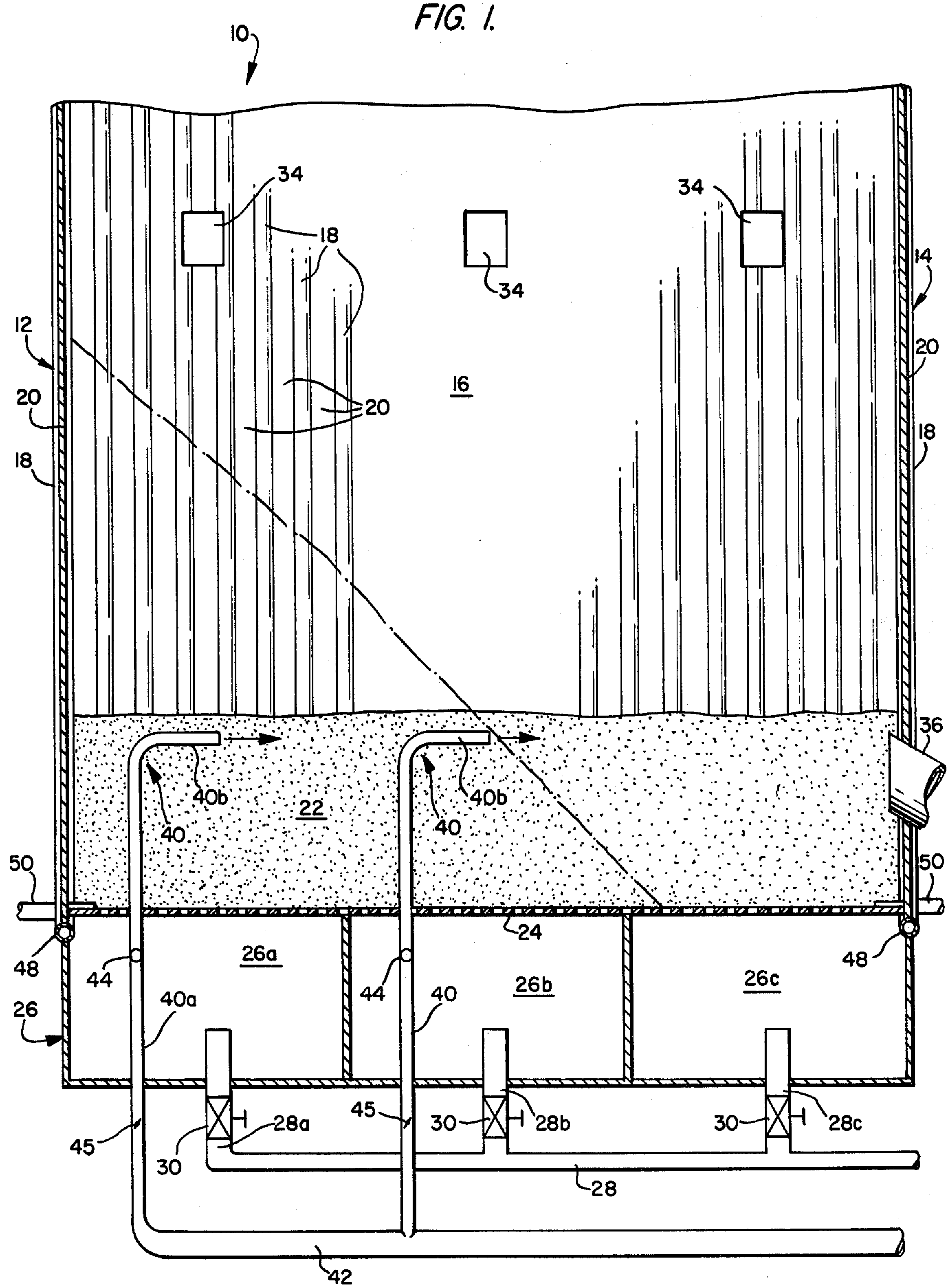
FIG. 1 is a vertical sectional view of a portion of a reactor according to the present invention.

Referring to FIG. 1 of the drawings, the reference numeral 10 refers in general to an enclosure forming a major portion of a fluidized bed reactor which may be in the form of a boiler, a combustor, a steam generator or any similar type device. The enclosure 10 consists of a front wall 12, a rear wall 14, and two sidewalls, one of which is shown by the reference numeral 16. According to the exemplary embodiment shown, each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a perforated plate, or grate, 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and is divided by a pair of vertical partitions into three plenum chambers **26*a*, 26*b* and 26*c*. An air conduit 28 is connected to a source of pressurized air (not shown) and has three vertically extending branch conduits 28*a*, 28*b* and 28*c* which extend into the chambers 26*a*, 26*b* and 26*c*,** respectively, for introducing the air into the chambers.

A flow control valve 30 is mounted in each branch conduit 28*a*, 28*b* and 28*c* and functions to control the flow of air into the chambers 26*a*, 26*b*, and 26*c*, respectively. The air entering each chamber 26*a*, 26*b* and 26*c* passes through the perforations in the grate 24 and into the corresponding portions of the bed 22 extending immediately above the chambers for fluidizing the respective bed portions. Thus, selective zonal fluidization of the respective areas of the bed 22 extending above the chambers 26*a*, 26*b* and 26*c* can be achieved by control of the air entering the chambers, for the reasons set forth above.

Three overbed feeders 34 extend through a side wall 16 and receive particulate coal from inlet ducts or the like (not shown), and are adapted to feed the coal particles onto the upper surface of the bed 22. The feeders 34 are aligned with the chambers 26*a*, 26*b* and 26*c*, respectively, and can operate by gravity discharge or can be in the form of spreader-type feeders or any other similar device. It is understood that additional feeders can also be provided on one or more of the other walls forming the enclosure 10 and that additional feeders can be provided for discharging a particulate adsorbent onto the bed 22.

A drain pipe 36 extends through the wall 14 and has an inlet end portion that registers with the interior of the enclosure 10 in communication with the lower portion of the bed 22. The pipe 36 is thus adapted to receive the spent bed material as it migrates downwardly in the bed and functions to discharge the material from the enclosure 10 by gravity to a screw cooler, conveyor belt, or the like (not shown).

A plurality of air distributors 40 extend through corresponding openings in the plate 24, and each connects to an air conduit 42. Each distributor 40 is formed by a vertically disposed tubular member 40*a* which extends through the plenum 26 and the plate 24 and into the bed 22, and a horizontal tubular member 40*b* which is connected to the vertical portion and which discharges the air from its free end portion in a plane above the plane of the plate 24. A conduit 44 is provided which connects each distributor 40 to a plurality of additional distributors (not shown) to form two rows of distributors respectively disposed in the chambers 26*a* and 26*b*. A damper 45 is provided in the vertical tubular portion of each distributor for controlling the air flow through the distributors 40.

As a result of the foregoing, air can be selectively discharged from the distributors 40 to prevent the build-up, or mounding, of particulate material in one or more portions of the bed 22 as needed. For example, assuming that, for the purpose of start-up, the valve 30 associated with the branch conduit 28*c* was opened and the valves 30 associated with the conduits 28*a* and 28*b* were closed, only that portion of the bed 22 extending above the chamber 26*c* would be fluidized. A bed light-off burner (not shown) would be provided through the rear wall 14 immedately above the plate 24 for initially lighting off the bed portion extending above the chamber 26*c* and additional particulate material would be selectively introduced to the bed portion from the corresponding feeder 34. The air passing through the portion of the bed 22 immediately above the chamber 26*c* would tend to blow a portion of the particulate material in a direction from right-to-left as viewed in the drawing, over onto the other portions of the bed to cause a build-up of the material, as shown by the dashed line. When a predetermined build-up of material occurs, air from the conduit 42 is passed through both rows of distributors 40 and into the bed portions immediately above the chambers 26*a* and 26*b* to blow the accumulated particulate material in a direction from left-to-right back towards the fluidized portion of the bed extending above the chamber 26*c*. As a result the height of the entire bed is maintained substantially level as shown by the solid line in the drawing.

A pair of horizontal headers 48 are connected in fluid communication with the tubes 18 forming the front wall 12 and the rear wall 14, respectively, and another pair of horizontal headers 50 are connected in fluid communication with the tubes 18 forming the sidewalls 16. It is understood that headers similar to the headers 48 and 50 are provided in communication with the upper ends of the walls 12, 14 and 16. As a result, a fluid to be heated can be sequentially or simultaneously passed through the walls 12, 14 and 16 to pick up the heat from the fluidized bed in a conventional manner before it is passed to external apparatus for further processing.

Figure 2:
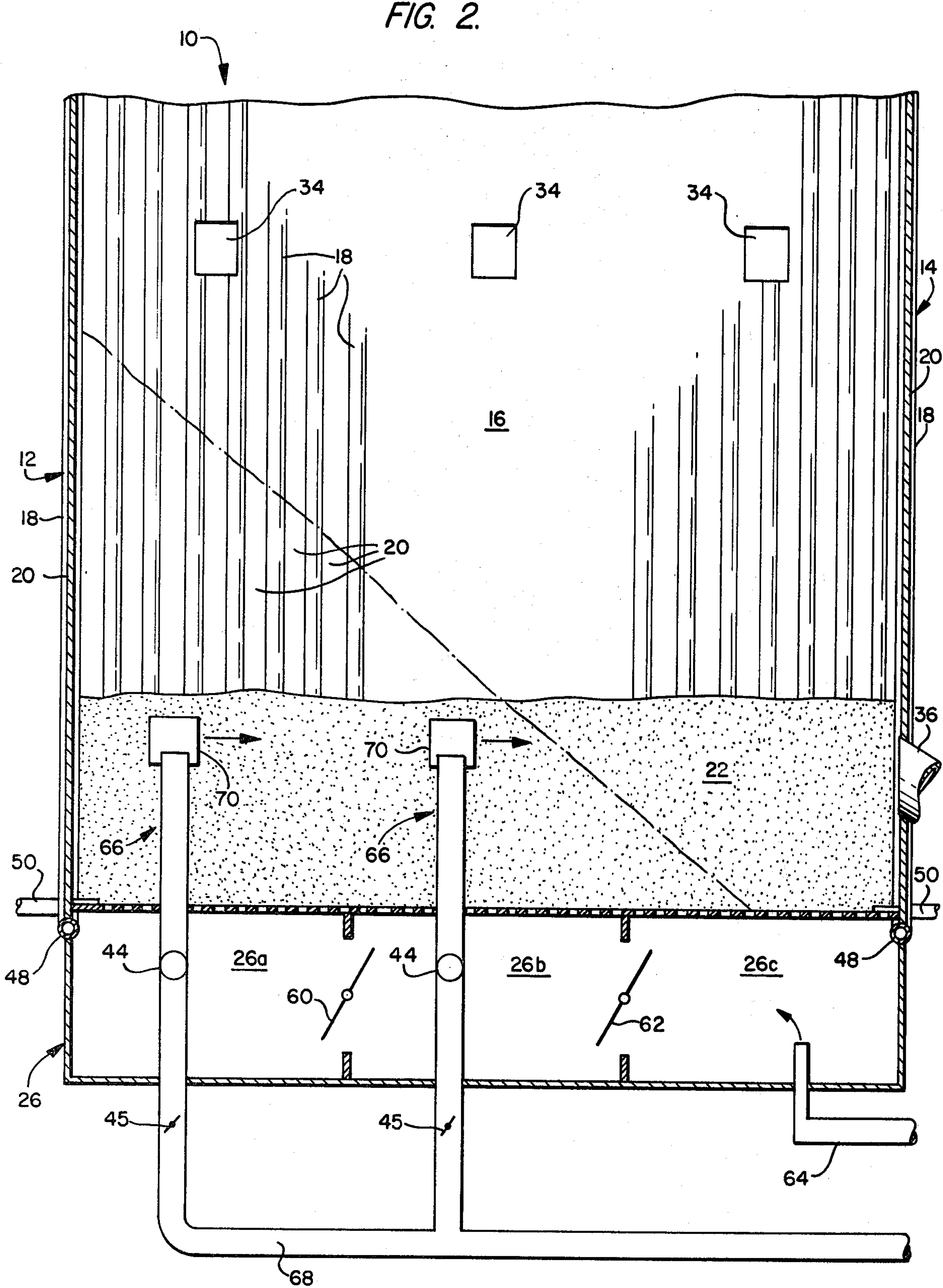
FIG. 2 is a view similar to FIG. 1, but depicting an alternate embodiment of the reactor of the present invention.

The embodiment of FIG. 2 is similar to that of the embodiment of FIG. 1 and identical components have been given the same reference numerals. According to the embodiment of FIG. 2, the air plenum 26 is divided into a plurality of chambers 26*a*, 26*b* and 26*c* by a pair of pivotal dampers 60 and 62 mounted in the plenum 26 in the spaced relationship shown. Air from a conduit 64 is introduced into the chamber 26*c* and, as is apparent from the drawings, the position of the damper 62 will control the flow of air into the chamber 26*b*, and the position of the damper 60 will control the flow of air into the chamber 26*a*, to permit selective zonal fluidization of bed portions extending above the chambers 26*a*, 26*b* and 26*c*.

Two rows of air distributors 66 are provided which extend through the chambers 26*a* and 26*b*, respectively, and are connected to a conduit 68 which, in turn, is connected to a source of pressurized air (not shown). The upper end portions of the distributors 66 extend into the bed 22 and have a discharge head 70 disposed on their upper end portions which head has one or more discharge openings for discharging the air 68 into the bed 22 in a direction from left-to-right as viewed in the drawings. Therefore, the air distributors 66 operate in the same manner as the distributors 40 in the previous embodiment to maintain a substantially constant level of particulate material in the bed 22 as shown by the solid line, and prevent the build-up or mounding of the particulate material, as shown for example by the dashed line which could occur during the zonal fluidization techniques discussed above.

It is understood that openings can be provided on all four faces of the discharge heads 70 and that by selective control of the air flow through the distributors 66 by the dampers 45, the anti-mounding air flow from the distributors can be in any horizontal direction desired, including both directions perpendicular to the plane of the drawing, depending on the particular order in which zonal fluidization occurs.

It is further understood that variations in the above arrangements can be made without departing from the scope of the invention. For example, the air distributors 40 of the embodiment of FIG. 1 can be used in the embodiment of FIG. 2 and vice versa, and the distributors can take a different configuration from those discussed above. Also the number and specific locations of the distributors as well as the zonal fluidization techniques can be varied as long as the above objectives and results are achieved. Further a bank, or series, of heat exchange tubes can be provided in the enclosure 10 for circulating water in a heat exchange relationship with the bed 22 in a conventional manner.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidized bed reactor comprising a housing, grate means supported in said housing, a bed of combustible particulate material supported on said grate means, means extending in said housing for supplying additional combustible particulate material to said bed of particulate material, an air plenum extending immediately below said grate means, said plenum being divided into a first chamber and at least two additional chambers, means for selectively passing air from said chambers through corresponding portions of said grate means and into corresponding portions of said bed extending above said chambers to selectively fluidize said bed portions, and an air distributor extending in each of the bed portions extending above said two additional chambers and directed towards the bed portion extending above said first chamber for selectively reducing the build-up of particulate material in the bed portions extending above said two additional chambers.

2. The reactor of claim 1 wherein each air distributor comprises a vertical conduit extending through its corresponding chamber, said grate means and into its corresponding bed portion, and means for supplying air to said conduit.

3. The reactor of claim 2 wherein each air distributor includes a discharge member attached to said conduit and adapted to discharge said air in a generally horizontal direction above the plane of said grate means.

* * * * *